(12) United States Patent
Takahashi (10) Patent No.: US 10,669,141 B2
(45) Date of Patent: Jun. 2, 2020

(54) INDUSTRIAL VEHICLE

(71) Applicant: MITSUBISHI NICHIYU FORKLIFT CO., LTD., Nagaokakyo-shi, Kyoto (JP)

(72) Inventor: Shunta Takahashi, Tokyo (JP)

(73) Assignee: MITSUBISHI NICHIYU FORKLIFT CO., LTD., Nagaokakyo-Shi, Kyoto (JP)

( * ) Notice: Subject to any disclaimer, the term of this patent is extended or adjusted under 35 U.S.C. 154(b) by 0 days.

(21) Appl. No.: 15/318,140

(22) PCT Filed: Jul. 29, 2014

(86) PCT No.: PCT/JP2014/069883
§ 371 (c)(1),
(2) Date: Dec. 12, 2016

(87) PCT Pub. No.: WO2016/016936
PCT Pub. Date: Feb. 4, 2016

(65) Prior Publication Data
US 2017/0137268 A1     May 18, 2017

(51) Int. Cl.
*B60K 5/00* (2006.01)
*B66F 9/075* (2006.01)
(Continued)

(52) U.S. Cl.
CPC ............... *B66F 9/075* (2013.01); *B60K 5/12* (2013.01); *B60K 13/04* (2013.01);
(Continued)

(58) Field of Classification Search
CPC ........ B66F 9/075; B66F 9/07513; B60K 5/12; B60K 13/04; B60K 5/1241
See application file for complete search history.

(56) References Cited

U.S. PATENT DOCUMENTS 3,903,738 A * 9/1975 Malchow ................. B60K 5/12
  73/114.15
4,173,264 A * 11/1979 Erker ..................... B62D 21/14
  180/68.5
(Continued)

FOREIGN PATENT DOCUMENTS

CN     101910577 A    12/2010
EP     2 873 817 A1    5/2015
(Continued)

OTHER PUBLICATIONS

International Preliminary Report on Patentability and Written Opinion of the International Searching Authority (Forms PCT/IB/338, PCT/IB/373, PCT/ISA/237 and PCT/IB/326) issued in International Application No. PCT/JP2014/069883 dated Feb. 9, 2017, together with English translations thereof.
(Continued)

*Primary Examiner* — Hau V Phan
(74) *Attorney, Agent, or Firm* — Birch, Stewart, Kolasch & Birch, LLP (57) ABSTRACT

An object is to provide an industrial vehicle whereby it is possible to arrange an exhaust purifying apparatus in an efficient layout, and to achieve a high purifying performance. An industrial vehicle includes: a cargo loading device disposed on a front part of a vehicle; a counter weight disposed on a rear part of the vehicle; an engine housed in an engine room formed in front of the counter weight inside the vehicle; and an exhaust purifying device disposed inside the engine room and configured to purify exhaust gas of the engine.

5 Claims, 7 Drawing Sheets

(51) Int. Cl.
    *B60K 5/12*         (2006.01)
    *B60K 13/04*       (2006.01)
    *F01N 3/021*      (2006.01)
    *F01N 1/08*       (2006.01)

(52) U.S. Cl.
    CPC ...... *B66F 9/07513* (2013.01); *B66F 9/07554* (2013.01); *B66F 9/07572* (2013.01); *F01N 1/08* (2013.01); *F01N 3/021* (2013.01)

(56) References Cited

U.S. PATENT DOCUMENTS

| | | | | |
|---|---|---|---|---|
| 7,108,283 | B2* | 9/2006 | Gotz | B60K 5/1241 180/299 |
| 8,459,014 | B2 | 6/2013 | Kamiya et al. | |
| 9,662,969 | B2* | 5/2017 | Nishimura | B60K 13/04 |
| 2004/0188994 | A1* | 9/2004 | Uematsu | B60G 9/02 280/759 |
| 2006/0005532 | A1* | 1/2006 | Kitahara | F02D 41/027 60/285 |
| 2006/0011396 | A1* | 1/2006 | Iwamoto | B62D 21/186 180/68.1 |
| 2006/0043656 | A1 | 3/2006 | Shimizu | |
| 2007/0204597 | A1* | 9/2007 | Nakano | F01N 3/021 60/276 |
| 2008/0275627 | A1* | 11/2008 | Matsunaga | F02D 41/144 701/108 |
| 2009/0120070 | A1* | 5/2009 | Hirata | B01D 53/944 60/286 |
| 2012/0151901 | A1* | 6/2012 | Fukuda | B01D 53/9445 60/286 |
| 2013/0160431 | A1* | 6/2013 | Tsumagari | F01N 3/025 60/274 |
| 2013/0175109 | A1* | 7/2013 | Takatsuji | B60K 13/04 180/309 |
| 2013/0256054 | A1 | 10/2013 | Nogami et al. | |
| 2015/0369109 | A1* | 12/2015 | Mitsuda | E02F 9/0891 180/309 |
| 2016/0046181 | A1* | 2/2016 | Nishimura | B60K 13/04 180/309 |

FOREIGN PATENT DOCUMENTS

| | | |
|---|---|---|
| JP | 59-113216 U | 7/1984 |
| JP | 63-6253 U | 1/1988 |
| JP | 9-175195 A | 7/1997 |
| JP | 10-157470 A | 6/1998 |
| JP | 11-11164 A | 1/1999 |
| JP | 11-139171 A | 5/1999 |
| JP | 11-314896 A | 11/1999 |
| JP | 2006-177544 A | 7/2006 |
| JP | 2010-143452 A | 7/2010 |
| JP | 2010-167941 A | 8/2010 |
| JP | 2010-215041 A | 9/2010 |
| JP | 2011-126315 A | 6/2011 |
| JP | 2014-34319 A | 2/2014 |
| JP | 2014-162296 A | 9/2014 |
| JP | 2004-34933 A | 5/2015 |
| WO | WO 2010/071082 A1 | 6/2010 |
| WO | WO 2014/002772 A1 | 1/2014 |

OTHER PUBLICATIONS

Extended European Search Report dated May 14, 2018, issued in corresponding European Application No. 14898766.2.
Chinese Office Action dated Jun. 4, 2018 in corresponding Chinese Application No. 201480078608.4.
Chinese Office Action and English translation for Chinese Application No. 201480078608.4, dated Mar. 1, 2019.
Third Office Action dated Sep. 4, 2019 in corresponding Chinese Application No. 201480078608.4.

* cited by examiner

INDUSTRIAL VEHICLE

TECHNICAL FIELD

The present disclosure relates to a technical field of industrial vehicles such as a forklift, including an exhaust purifying device for purifying exhaust gas of an engine that serves as a power source.

BACKGROUND ART

To purify exhaust gas containing air pollutant substances discharged from an engine of a vehicle, an exhaust purifying device may be provided in an exhaust pipe. Furthermore, to reduce noise that occurs during discharge of exhaust gas, a noise-decreasing device (muffler) may be provided in an exhaust pipe. Such an exhaust purifying device and a noise-decreasing device are mounted to a vehicle in an appropriate layout.

An industrial vehicle is provided with a heavy object such as a cargo handling device mounted to the front side of the vehicle, and thus a counter weight is provided on the rear side of the vehicle, to balance the weight of the vehicle in the front-rear direction. The counter weight needs to be large enough to have a sufficient weight, which may considerably affect the layout of the above described exhaust purifying device and noise-decreasing device. Patent Documents 1 and 2 disclose an exemplary layout of an exhaust purifying device and a noise-decreasing device for such type of industrial vehicle.

Figure 7:
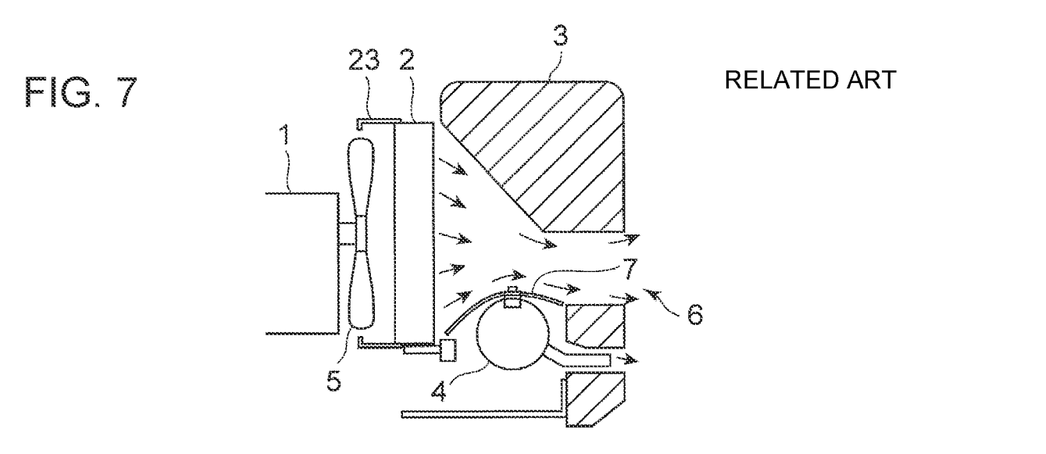
FIG. 7 is a schematic diagram simply showing a layout of an industrial vehicle including a noise-decreasing device according to Patent Document 1.

FIG. 7 is a schematic diagram simply showing a layout of a noise-decreasing device of an industrial vehicle according to Patent Document 1. The vehicle includes an engine 1, a radiator 2 for releasing heat from coolant water flowing through a coolant passage 23 of the engine 1, a counter weight 3 disposed behind the radiator 2, and a muffler 4 for reducing exhaust noise. A blast fan 5 operates in accordance with operation of the engine 1, so that blast from the blast fan 5 passes through the radiator 2, before being discharged outside via a vent 6 having a window shape formed on the counter weight 3. The muffler 4 is shielded by a current plate 7 at the downstream side of the counter weight 3 so as not to interfere with blast from the blast fan 5.

In FIG. 7, the muffler 4 is disposed outside an engine room.

Figure 8A:
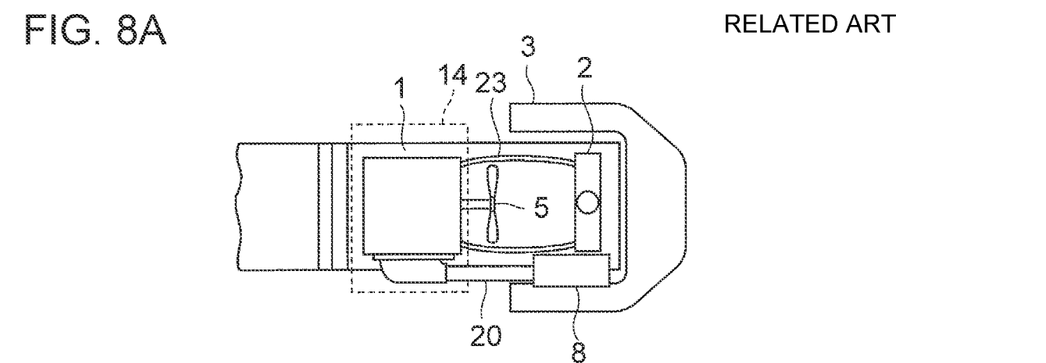
FIG. 8A is a schematic diagram simply showing the first layout of an exhaust purifying device of an industrial vehicle according to Patent Document 2.
Figure 8B:
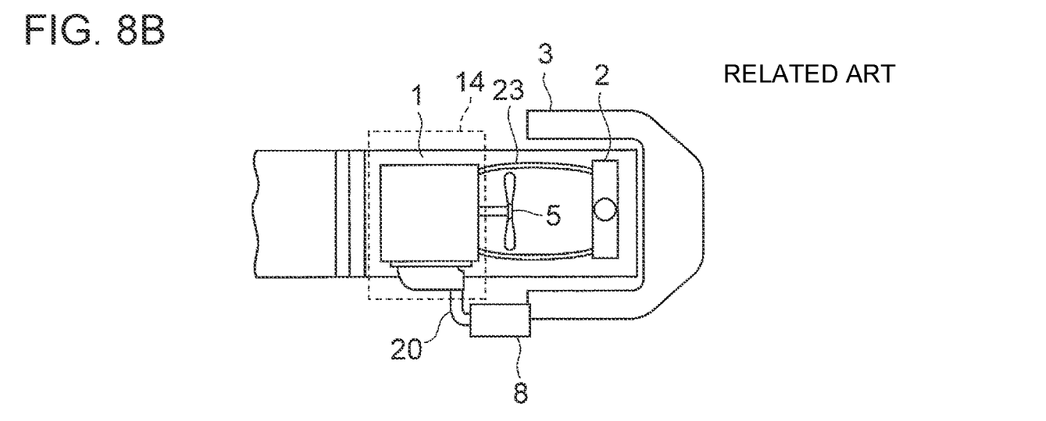
FIG. 8B is a schematic diagram simply showing the second layout of an exhaust purifying device of an industrial vehicle according to Patent Document 2.

FIG. 8A is a schematic diagram simply showing the first layout of an industrial device including an exhaust purifying device according to Patent Document 2. FIG. 8B is a schematic diagram simply showing the second layout of an industrial vehicle including an exhaust purifying device according to Patent Document 2. In FIGS. 8A and 8B, the same features as those in FIG. 7 are associated with the same reference signs, and not described again.

In the example, a diesel engine is mounted to a vehicle as the engine 1, and a diesel particulate filter (DPF) 8 is provided as an exhaust purifying device, which collects and purifies non-combusted particulate matters (PM) contained in exhaust gas. The DPF 8 performs a regenerating process of combusting accumulated PM by utilizing high-temperature exhaust gas from the engine 1, and thereby maintains its purifying performance. However, if an exhaust pipe 20 between the engine 1 and the DPF 8 is long, the temperature of exhaust gas to be taken into the DPF 8 may decrease.

In the example of FIG. 8A, the DPF 8 is disposed on a lateral side of the radiator 2 to shorten the exhaust pipe 20 between the engine 1 and the DPF 8, thereby ensuring that a sufficient temperature of exhaust gas is taken into the DPF 8, to improve the purifying performance.

Furthermore, it is necessary to perform maintenance to maintain the purifying performance of a DPF including attaching and detaching works by workers, and thus the DPF 8 is disposed on a step of the vehicle in the example of FIG. 8B. Accordingly, the DPF 8 is more accessible for workers, while the length of the exhaust pipe 20 between the engine 1 and the DPF 8 is reduced.

In FIGS. 8A and 8B, dotted lines 14 indicate an engine room that houses the engine 1, and the DPF 8 is disposed outside the engine room 14.

CITATION LIST

Patent Literature

Patent Document 1: JPH11-139171A
Patent Document 2: JP2010-215041A

SUMMARY

Problems to be Solved

In Patent Document 1, it is necessary to ensure a space for housing the muffler 4 inside the counter weight 3 to position the muffler 4 at a lower part of the counter weight 3, which leads to a size increase of the counter weight 3. Such a size increase, as a result, may deteriorate the rear view and the radius of turn, which are important for industrial vehicles such as a forklift. Furthermore, the gravity center of the counter weight 3 moves as much upward as an installment space is ensured for the muffler 4, which may reduce stability of the vehicle. Furthermore, the muffler 4 is disposed downstream of the radiator 2 with respect to the flowing direction of the blast, and may obstruct a flow of coolant air blowing from the radiator 2 and deteriorate the cooling performance of the radiator 2.

Patent Document 1 does not disclose providing an exhaust purifying device like the DPF 8. Nevertheless, if the DPF 8 is provided at a lower part of the counter weight 3 on the basis of an idea similar to that concerning the muffler 4, it may bring about an increase in the distance between the engine 1 and the DPF 8 as well as a decrease in the temperature of exhaust gas to be taken into the DPF 8, thus raising a risk of deterioration of the purifying performance, in addition to the above described problems.

In Patent Document 2, the DPF 8 is disposed on a lateral side of the radiator 2 as depicted in FIG. 8A, so as to reduce the distance between the engine 1 and the DPF 8 as compared to Patent Document 1. However, there still remains a certain distance between the engine 1 and the DPF 8, which can be further reduced.

Furthermore, in FIG. 8B, the DPF 8 is disposed inside the step 8 to reduce the distance between the engine 1 and the DPF 8 further as compared to FIG. 8A, but the DPF 8 gets extremely hot during operation and should not be disposed on a step that is likely to be touched by human hands. Furthermore, it is not easy to ensure a space for installing the DPF 8 inside the step, especially in a small vehicle. Still further, if an exhaust purifying device is disposed outside a vehicle frame, it may deteriorate the assembly performance.

At least one embodiment of the present invention was made in view of the above issues, and an object is to provide an industrial vehicle whereby it is possible to arrange an exhaust purifying apparatus in an efficient layout, and to achieve a high purifying performance.

Solution to the Problems (1) An industrial vehicle according to at least one embodiment of the present invention comprises: a cargo loading device disposed on a front part of a vehicle; a counter weight disposed on a rear part of the vehicle; an engine housed in an engine room formed in front of the counter weight inside the vehicle; and an exhaust purifying device disposed inside the engine room and configured to purify exhaust gas of the engine.

According to at least one embodiment of the present invention, the exhaust purifying device is disposed inside the engine room, and thereby it is possible to further shorten the distance between the engine and the exhaust purifying device. Accordingly, it is possible to prevent a temperature decrease of exhaust gas to be taken into the exhaust purifying device, and to improve the purifying performance. Furthermore, it is no longer necessary to ensure a space for installing the exhaust purifying device inside the counter weight, which makes it possible to reduce the size of the counter weight. As a result, it is possible to improve the rear view and the turning performance, as well as to lower the gravity center of the counter weight to obtain a high stability for the vehicle.

In the present specification, an engine room refers to a space for housing an engine, for instance, a space defined by vehicle frames mounted to a vehicle so as to surround an engine, and preferably, a space further defined by an engine cover that covers an engine from above.

(2) In some embodiments, in the industrial vehicle according to the above (1), the exhaust purifying device may comprise a flow-through type diesel particulate filter.

In this embodiment, if a diesel particulate filter (DPF) is to be provided as an exhaust purifying device, a flow-through type DPF is employed. While the wall-flow type DPF has been widely used and has a high collecting efficiency, it requires frequent maintenance due to soot accumulation. In contrast, the flow-through type DPF has a structure free from soot accumulation which requires less frequent maintenance, and thus has fewer problems when disposed in an engine room less accessible for workers.

(3) In some embodiments, the industrial vehicle according to the above (1) or (2) further comprises a noise-decreasing device disposed downstream of the exhaust purifying device in an exhaust pipe of the engine and housed inside the engine room.

According to the above embodiment, the noise-decreasing device is housed in the engine room, which makes it no longer necessary to provide a space for installing the noise-decreasing device in the counter weight. Thus, it is possible to reduce the size of the counter weight even further.

(4) In some embodiments, in the industrial vehicle according to any one of the above (1) to (3), the exhaust purifying device is disposed in front of a radiator configured to release heat from coolant water of the engine.

According to the above embodiment, the exhaust purifying device is disposed in front of the radiator, and thus the exhaust purifying device does not interfere with blast from the radiator, which makes it possible to improve the cooling performance of the radiator.

(5) In some embodiments, in the industrial vehicle according to any one of the above (1) to (4), the engine is suspended and supported at both sides of the engine by brackets mounted to vehicle frames of the vehicle.

According to this embodiment, the engine is suspended and supported from both sides of the engine by brackets on the vehicle frames, which makes it possible to ensure a space for installing an exhaust purifying device or the like below the engine, and to realize an efficient layout in an engine room.

(6) In some embodiments, in the industrial vehicle according to the above (5), the vehicle frames include a rib protruding in a horizontal direction toward the engine. The brackets comprise: a support member having a horizontal surface fixed to the rib and a vertical surface coupled to the horizontal surface; and a fixing member having an end fixed parallel to the vertical surface and another end fixed parallel to a surface of the engine.

According to the above embodiment, the engine is suspended and supported by the brackets having the support member and the fixing member as described above, which makes it possible to fix the engine, which may vibrate, to the vehicle frames securely.

(7) In some embodiments, in the industrial vehicle according to the above (5) or (6), the exhaust purifying device is disposed in a space below the engine, the space being formed by the engine being suspended and supported by the brackets.

According to the above embodiment, it is possible to realize an efficient layout in an engine room.

(8) In some embodiments, the industrial vehicle according to any one of the above (1) to (7) may further comprise a fuel tank disposed above the counter weight.

According to the above embodiment, the fuel tank is disposed inside a space above the counter weight, the space being formed by making the counter weight compact, which makes it possible to facilitate access to the fuel tank and ease the burden of maintenance works such as oil feeding.

Advantageous Effects

According to at least one embodiment of the present invention, the exhaust purifying device is disposed inside the engine room, and thereby it is possible to further shorten the distance between the engine and the exhaust purifying device. Accordingly, it is possible to prevent a temperature decrease of exhaust gas to be taken into the exhaust purifying device, and to improve the purifying performance. Furthermore, it is no longer necessary to ensure a space for installing the exhaust purifying device inside the counter weight, which makes it possible to reduce the size of the counter weight. As a result, it is possible to improve the rear view and the turning performance, as well as to lower the gravity center of the counter weight to obtain a high stability for the vehicle.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved. On the other hand, an expression such as "comprise", "include", "have", "contain" and "constitute" are not intended to be exclusive of other components.

Figure 1:
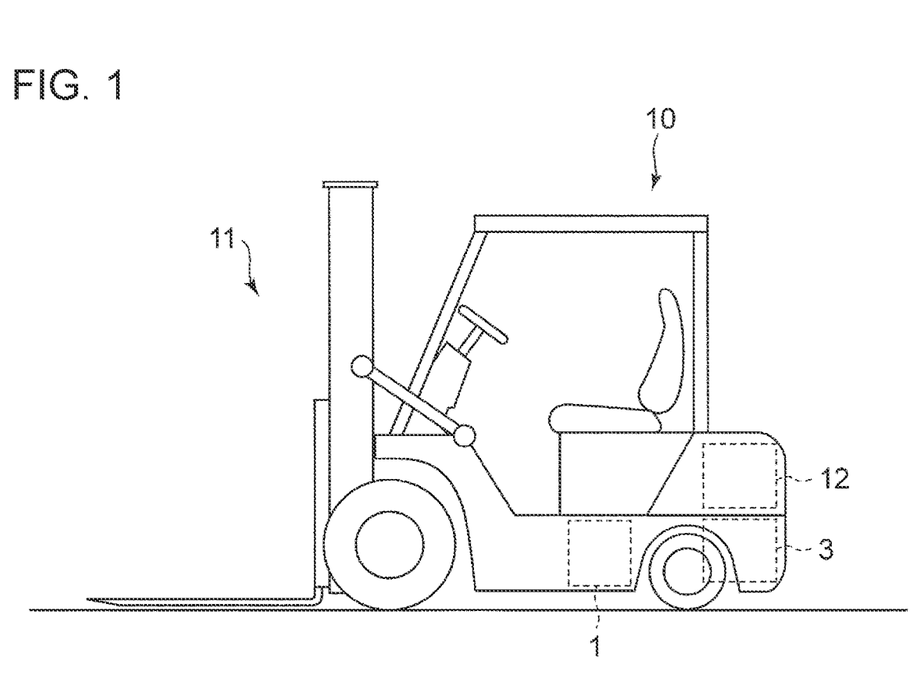
FIG. 1 is a schematic side view of an overall configuration of an industrial vehicle according to an embodiment of the present invention.

FIG. 1 is a schematic side view of an overall configuration of an industrial vehicle according to an embodiment of the present invention.

An industrial vehicle is a forklift vehicle including a cargo handling device 11 capable of lifting a cargo in front of a driver's seat 10. A diesel engine 1 (hereinafter, referred to as "engine" where needed) serving as a power source is mounted to the vehicle, and the power of the engine 1 is used to drive the vehicle and to operate the cargo handling device 11.

The cargo handling device 11, which is a heavy object, is disposed on a front part of the vehicle, and weighs more when a cargo is loaded thereon. In view of this, a counter weight 3 is mounted behind the driver's seat 10 to balance the weight of the vehicle in the front-rear direction, thereby ensuring the turning performance and stability, which are important for an industrial vehicle.

A fuel tank 12 is disposed above the counter weight 3.

Figure 2:
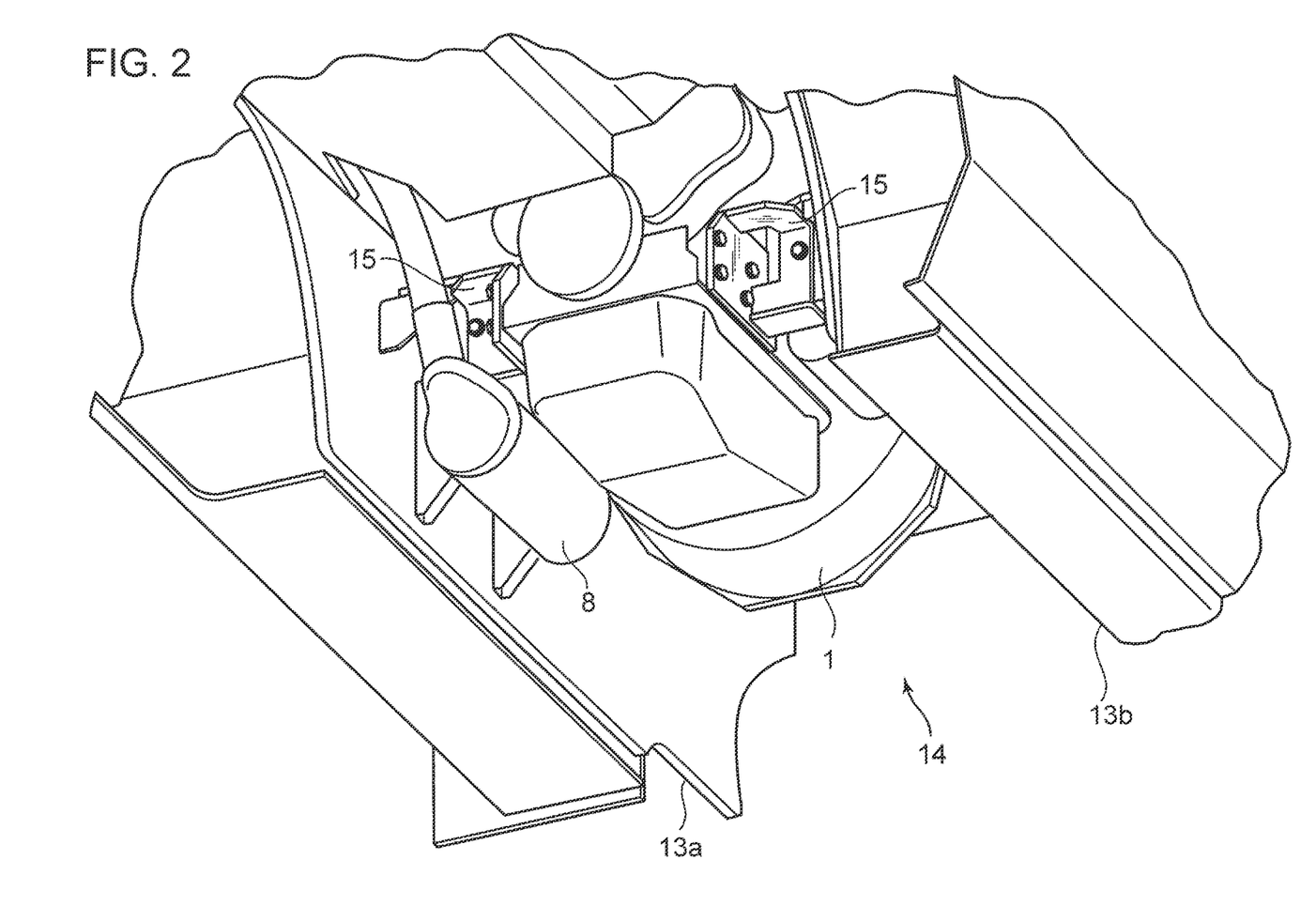
FIG. 2 is a perspective view, as seen from below, of an engine and its surrounding structure of an industrial vehicle according to an embodiment of the present invention.

FIG. 2 is a perspective view, as seen from below, of an engine and its surrounding structure of an industrial vehicle according to an embodiment of the present invention.

The engine 1 is housed inside an engine room 14 surrounded by a vehicle frame 13. The engine room 14 means, in a broad sense, a space provided for housing the engine 1 inside the vehicle. Preferably, the engine room 14 may be defined by the vehicle frame 13 so as to surround at least a part of a lateral part of the engine 1. More preferably, the engine room 14 may be covered with an engine cover (not depicted) at least partially above the engine 1.

In FIG. 2, two vehicle frames 13 are provided, as indicated by the reference signs 13a and 13b, so as to extend along both sides of the engine 1. The engine 1 is suspended via engine mount brackets 15 (hereinafter, referred to as simply "brackets" if needed) disposed respectively on the vehicle frames 13a and 13b at both sides of the engine 1. Although a fixed engine commonly has no room below the engine 1, a space can be easily provided below the engine 1 in the present embodiment, by suspending and supporting the engine 1, which makes it possible to dispose an exhaust purifying device (DPF 8) described below or the like in the engine room 14.

Figure 3:
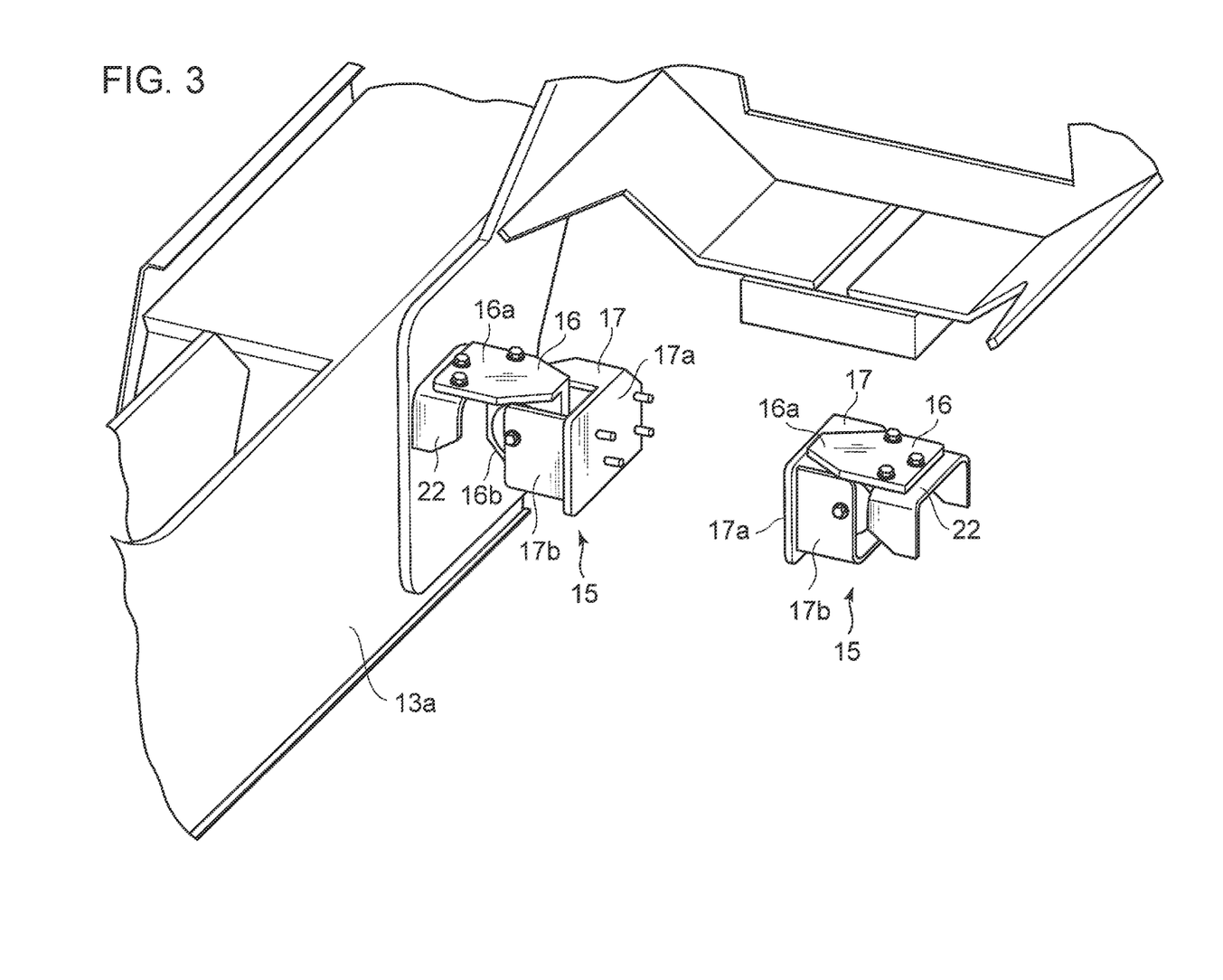
FIG. 3 is a perspective view showing a vehicle frame and brackets extracted from FIG. 2.

FIG. 3 is a perspective view showing the vehicle frame 13 and the brackets 15 extracted from FIG. 2. In FIG. 3, the vehicle frame 13b is not depicted so as to provide a better view of the layout of the brackets 15.

The brackets 15 are disposed on the vehicle frames 13a and 13b, and each of the brackets includes a support member 16 and a fixing member 17.

A rib 22 is disposed on a face of each of the vehicle frames 13 so as to protrude in the horizontal direction toward the engine 1. A horizontal surface 16a of the support member 16 is fixed to each of the ribs 22 with a plurality of bolts. A vertical surface 16b is coupled to the horizontal surface 16a at a substantially right angle, and thus the support member 16 has a substantially L-shape.

The fixing member 17 is fixed parallel to the vertical surface at one end, and parallel to a surface of the engine 1 at the other end. More specifically, the fixing member 17 has a fixing surface 17a disposed so as to face the surface of the engine 1, and is fixed to the engine 1 with a plurality of bolts. A coupling surface 17b is formed on the fixing surface 17a so as to protrude toward the vehicle frame 13. The coupling surface 17b is fixed with bolts to the vertical surface 16b of the support member 16, and particularly in the present embodiment, is configured to be fixable with bolts from both sides of the vertical surface 16b. With the bracket 15 having the above configuration, it is possible to fix the engine 1, which may vibrate, to the vehicle frame 13 securely.

Figure 4:
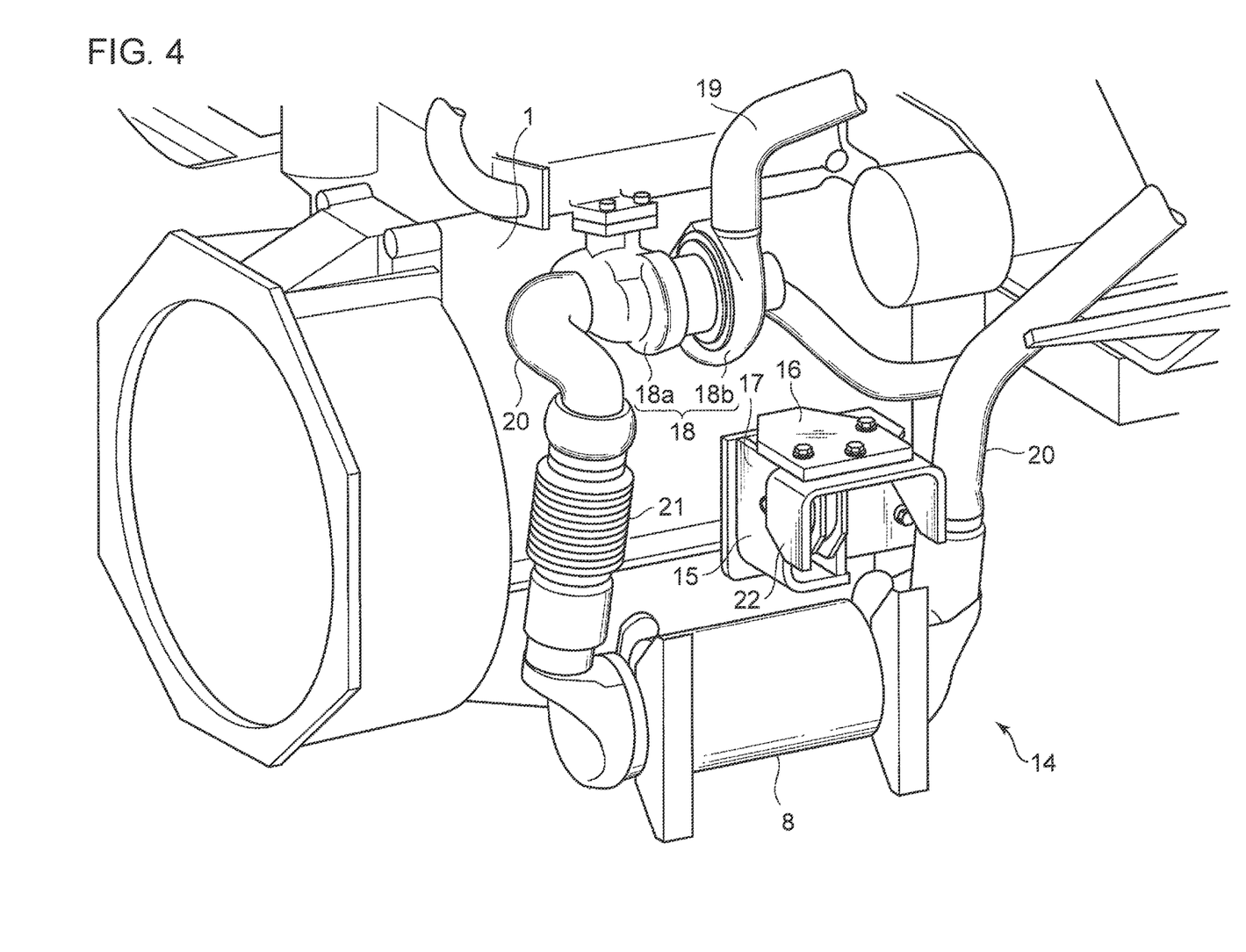
FIG. 4 is a perspective view of a structure around an engine housed in an engine room.

FIG. 4 is a perspective view of an engine and its surrounding structure housed in the engine room 14.

The engine 1 includes an exhaust turbocharger 18 having an exhaust turbine 18a and a compressor 18b coaxially driven by the exhaust turbine 18a. Air taken in from an intake pipe 19 is compressed and heated by the compressor 18b, cooled by an inter cooler (not depicted), and supplied to a combustion chamber.

In the combustion chamber, compression ignition combustion is performed, where exhaust gas generated by combustion drives the exhaust turbine 18a disposed in the exhaust pipe 20 to serve as a power source of the compressor 18b, and is supplied to a diesel particulate filter (DPF) 8 provided as an exhaust purifying device.

The DPF 8 is housed in the engine room 14, and especially in a space formed below the engine 1 (that is, a space formed by suspending and supporting the engine 1 with the brackets 15). The exhaust pipe 20 is arranged toward the DPF 8 disposed below the engine 2. A bellows pipe 21 that is extensible in the extending direction is inserted into a part of the exhaust pipe 20 at the upstream side of the DPF 8, which prevents transmission of vibration of the engine 1 to downstream.

In some embodiments, the bellows pipe 21 is disposed in a straight section of the exhaust pipe 20 (e.g. a section extending linearly in the vertical direction as depicted in FIG. 4.). The bellows pipe 21 absorbs vibration of the engine 1 and is required to have a high durability, and disposing the bellows pipe 21 in a straight section equalizes the vibration transmitted to the diameter of the bellows pipe 21 over the entire periphery, which makes it possible to achieve a high durability.

A flexible pipe having a flexibility may be used instead of, or in addition to, the bellows pipe 21.

Accordingly, with the DPF 8 disposed in the engine room 14, it is possible to shorten the exhaust pipe 20 between the engine 1 and the DPF 8, which makes it possible to suppress a decrease in the temperature of exhaust gas to be taken into the DPF 8, and to improve the purifying performance.

Meanwhile, a wall-flow type DPF has been widely used, which collects PM from exhaust gas that passes through a ceramic filter having a honeycomb structure, has a high collecting efficiency, but tends to require more frequent maintenance. Thus, a wall-flow type DPF needs to be disposed in a position accessible for a worker during maintenance and cannot be disposed inside the engine room 14, unlike the present embodiment.

Thus, in the present embodiment, a flow-through type DPF is employed. A flow-through type DPF has a structure free from soot accumulation, unlike the above described wall-flow type DPF. Thus, the flow-through type DPF requires maintenance far less frequently than the wall-flow type DPF, and thus has fewer problems when disposed in the engine room 14 less accessible for workers.

While the present embodiment includes the DPF 8 as an exhaust purifying device, a diesel oxidation catalyst (DOC) may be further provided upstream of the DPF 8, which utilizes oxygen contained in exhaust gas to oxidize non-combusted substances mainly including hydrocarbon (HC) in exhaust gas to decompose the non-combusted substances to water ($H_2O$) and carbon dioxide ($CO_2$). In this case, during regeneration of the DPF 8, a post-injection device disposed upstream of the DOC injects fuel (HC) into the exhaust pipe 20 to oxidize fuel contained in the exhaust gas with the DOC and heat the exhaust gas, and sends the heated exhaust gas to the DPF 8, thereby combusting accumulated PM.

Figure 5:
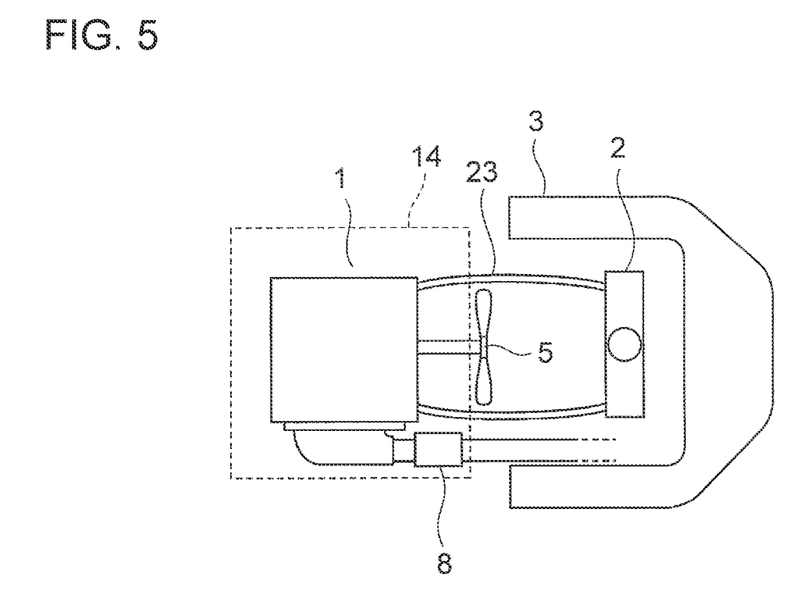
FIG. 5 is a schematic diagram showing a surrounding structure of an engine along with a coolant passage.

FIG. 5 is a schematic diagram showing the engine 2 and its surrounding structure along with a coolant passage 23.

Coolant water heated by the engine 1 exchanges its heat with ambient air to be cooled, at the radiator 2 disposed in the coolant passage 23. The blast fan 5 rotates in accordance with operation of the engine 1 and sends ambient air into the radiator 2, which promotes heat exchange with the coolant water. Blast having passed through the radiator 2 is discharged outside the vehicle via a vent 6 (see FIG. 7) of the counter weight 3 disposed in the rear.

As depicted in FIG. 7, an exhaust purifying device such as the DPF 8 has been typically disposed in the vicinity of the vent 6 of the counter weight 3, thus being an obstacle for blast and causing the cooling performance of the radiator 2 to deteriorate. In the present embodiment, the DPF 8, which can be an obstacle for blast, is disposed inside the engine room 14 in front of the radiator 2, and thereby it is possible to improve the cooling performance of the radiator 2.

Furthermore, it is no longer necessary to ensure a space for installing the DPF 8 inside the counter weight 3, which makes it possible to reduce the size of the counter weight 3 to improve the rear view and the turning performance, as well as to lower the gravity center of the counter weight 3 to obtain a high stability for the vehicle. In particular, with the counter weight 3 having a lower height and a shorter length, it is possible to improve the rear view. Furthermore, with the counter weight 3 having a smaller profile, it is possible to reduce the radius of turn, and thus to provide an industrial vehicle having a high maneuverability.

Still further, since the counter weight 3 can be made compact as described above, the fuel tank 12 disposed on the counter weight 3 is more accessible, which makes it possible to reduce the burden of maintenance works such as oil feeding.

Figure 6:
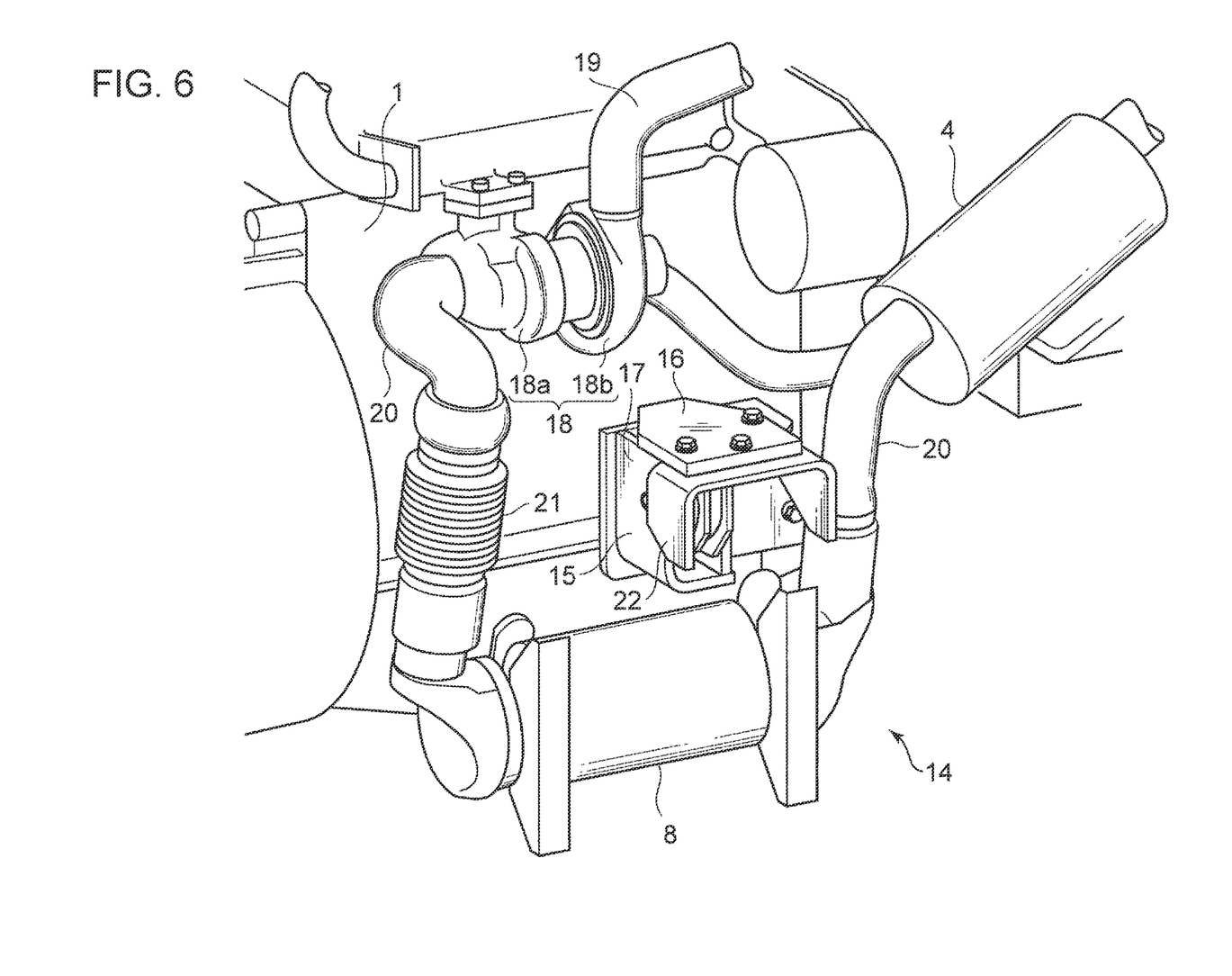
FIG. 6 is a perspective view, as seen from below, of an engine and its surrounding structure of an industrial vehicle according to an embodiment of the present invention.

FIG. 6 is a perspective view, as seen from below, of an engine and its surrounding structure of an industrial vehicle according to an embodiment of the present invention.

In the present embodiment, the muffler 4 serving as a noise-decreasing device for suppressing noise is disposed downstream of the DPF 8 in the exhaust pipe 20. As depicted in FIG. 7, the muffler 4 has been typically disposed in a space formed at a lower part of the counter weight 3, thus being an obstacle for blast from the radiator 2 and causing the cooling performance to deteriorate.

In contrast, in the present embodiment, the muffler 4 is disposed inside the engine room 14 similarly to the DPF 8, as depicted in FIG. 6, Accordingly, it is possible to avoid the muffler 4 being an obstacle for the blast from the radiator 2, and to improve the cooling performance. Furthermore, it is no longer necessary to form a space for installing the muffler 4 at a lower part of the counter weight 3, which makes it possible to make the counter weight 3 compact and of a lower gravity center, thereby improving the turning performance and stability.

While the muffler 4 is disposed in the engine room 14 in addition to the DPF 8 in the present embodiment, other components may be disposed in the engine room 14 to improve efficiency of the layout, on the basis of a similar idea.

As described above, according to at least one embodiment of the present invention, the DPF 8 is disposed inside the engine room 14, and thereby it is possible to shorten the distance between the engine 1 and the DPF 8. Accordingly, it is possible to prevent a temperature decrease of exhaust gas to be taken into the DPF 8, and to improve the purifying performance. Furthermore, it is no longer necessary to ensure a space for installing the DPF 8 inside the counter weight 3, which makes it possible to reduce the size of the counter weight 3. As a result, it is possible to improve the rear view and the turning performance, as well as to lower the gravity center of the counter weight 3 to obtain a high stability for the vehicle.

INDUSTRIAL APPLICABILITY

At least one embodiment of the present invention can be suitably applied to industrial vehicles such as a forklift including an exhaust purifying device for purifying exhaust gas of an engine that serves as a power source.

DESCRIPTION OF REFERENCE NUMERAL

1 Engine
2 Radiator
3 Counter weight
4 Noise-decreasing device (muffler)
5 Blast fan
6 Vent
8 Exhaust purifying device (DPF)
9 Exhaust pipe 10 Driver's seat
11 Cargo handling device
12 Fuel tank
13 Vehicle frame
14 Engine room
15 Engine-mount bracket
16 Support member
17 Fixing member
18 Exhaust turbocharger
19 Intake pipe
20 Exhaust pipe
21 Bellows pipe
22 Rib

The invention claimed is:

1. An industrial vehicle, comprising:
a cargo loading device disposed on a front part of a vehicle;
a counter weight disposed on a rear part of the vehicle, a direction extending from the front part to the rear part of the vehicle defining a longitudinal direction of the vehicle;
an engine housed in an engine room formed in front of the counter weight inside the vehicle; and
an exhaust purifying device disposed inside the engine room and configured to purify exhaust gas of the engine, the exhaust purifying device including a diesel particulate filter (DPF) having a cylindrical shape,
wherein the engine is suspended and supported at two vertical, opposing sides of the engine by brackets respectively mounted to a vertical side wall of two opposing vehicle frames of the vehicle,
wherein the vertical side wall of the opposing vehicle frames include a rib protruding in a horizontal direction toward the engine,
wherein the brackets comprise:
a support member having a horizontal surface fixed to the rib and a vertical surface coupled to the horizontal surface, and
a fixing member having an end fixed parallel to the vertical surface and another end fixed parallel to a surface of the engine,
wherein the DPF is disposed in a space vertically below the engine, the space being formed by the engine being suspended and supported by the brackets, and
wherein the DPF is attached to one of the two opposing vehicle frames such that a longitudinal direction of the DPF is along the longitudinal direction of the vehicle.

2. The industrial vehicle according to claim 1, wherein the exhaust purifying device comprises a flow-through type diesel particulate filter.

3. The industrial vehicle according to claim 1, further comprising
a noise-decreasing device disposed downstream of the exhaust purifying device in an exhaust pipe of the engine and housed inside the engine room.

4. The industrial vehicle according to claim 1, wherein the exhaust purifying device is disposed in front of a radiator configured to release heat from coolant water of the engine.

5. The industrial vehicle according to claim 1, further comprising a fuel tank disposed above the counter weight.

* * * * *